(12) United States Patent
Baldie et al.

(10) Patent No.: US 9,922,187 B2
(45) Date of Patent: Mar. 20, 2018

(54) SYSTEM AND METHOD FOR ACCESSING A TOUCH ENABLED DEVICE

(71) Applicant: American Express Travel Related Services Company, Inc., New York, NY (US)

(72) Inventors: David Baldie, New York, NY (US); Elton Kent, New York, NY (US)

(73) Assignee: AMERICAN EXPRESS TRAVEL RELATED SERVICES COMPANY, INC., New York, NY (US)

( * ) Notice: Subject to any disclaimer, the term of this patent is extended or adjusted under 35 U.S.C. 154(b) by 235 days.

(21) Appl. No.: 14/732,985

(22) Filed: Jun. 8, 2015

(65) Prior Publication Data
US 2016/0357300 A1 Dec. 8, 2016

(51) Int. Cl.
G06F 3/041 (2006.01)
G06F 21/36 (2013.01)
G06F 3/0488 (2013.01)

(52) U.S. Cl.
CPC .......... *G06F 21/36* (2013.01); *G06F 3/04883* (2013.01)

(58) Field of Classification Search
CPC .............................. G06F 21/36; G06F 3/03547
See application file for complete search history.

(56) References Cited

U.S. PATENT DOCUMENTS

| | | | | |
|---|---|---|---|---|
| 8,830,181 B1* | 9/2014 | Clark | ................. | G06F 3/04883 345/173 |
| 2013/0222285 A1* | 8/2013 | Lee | ......................... | G06F 3/017 345/173 |
| 2014/0143859 A1* | 5/2014 | Linge | ...................... | G06F 21/36 726/19 |
| 2015/0264169 A1* | 9/2015 | Yim | ................... | H04M 1/72563 455/411 |

* cited by examiner

*Primary Examiner* — Ilana Spar
*Assistant Examiner* — Brent D Castiaux
(74) *Attorney, Agent, or Firm* — Snell & Wilmer L.L.P.

(57) ABSTRACT

A system for accessing a system with a touch sensitive interface is provided. The system may be configured for determining a first location and first touch pressure of the first input, determining a second location and a second touch pressure of the second input, and a first time between the first input and the second input. The system may also comprise determining a third location and a third touch pressure of the third input, and a second time between the second input and the third input. The system may further comprise determining a total time for the inputs and comparing the inputs to a unique touch pattern.

19 Claims, 6 Drawing Sheets

SYSTEM AND METHOD FOR ACCESSING A TOUCH ENABLED DEVICE

FIELD

The present disclosure relates to accessing touch enabled devices and, more specifically, to systems and methods for using tempo based touch authenticating protocols.

BACKGROUND

The rise of touch enabled electronic devices and access points, and the need for increased security of touch enabled devices and access points, has created an increased need for ways to secure and validate touch enabled devices. Traditional pin and pattern inputs typically found in today's cell phones provide lower levels of security than is desirable. A user's pin or pattern is easily detected by another with simple observation. As such, there is an increased need for methods to validate touch enabled devices that are secure and discrete (e.g., difficult for others to observe).

SUMMARY

In various embodiments, a system, method, and computer readable medium (collectively, the "System") for accessing a system with a touch sensitive interface is provided. The System may be configured to perform operations and/or steps comprising determining, by a processor in electronic communication with a touch sensitive interface, a first location of the first input and first touch pressure of the first input in response to receiving the first input on the touch sensitive interface. The System may further comprise determining, by the processor, a second location of the second input, a second touch pressure of the second input, and a first time between the first input and the second input in response to receiving the second input on the touch sensitive interface. The System may also comprise determining, by the processor, a third location of the third input, a third touch pressure of the third input, and a second time between the second input and the third input in response to receiving the third input on the touch sensitive interface. The System may further comprise determining, by the processor, a total time for the first input, the second input and the third input to be entered. The System may also comprise comparing, by the processor, the first input, the second input, and the third input to a unique touch pattern.

In various embodiments, the System may further comprise defining, via the processor, the unique touch pattern via the touch sensitive interface, wherein the touch pattern comprises at least a first input, a second input, and a third input. The System may also comprise determining, by the processor, a control parameter that is defined by and indicative of the unique touch pattern, in response to receiving the unique touch pattern via the touch sensitive interface.

In various embodiments, the System may further comprise granting access to a device in response to the comparing being a success. The device may be a mobile computing device. The touch sensitive interface may be part of a door, a point of sale device, or a computing device.

In various embodiments, the System may further comprise displaying, by the processor a grid defining a plurality of grid locations on the touch sensitive interface. The first location corresponds to a grid location of the plurality of grid locations.

In various embodiments, the System may further comprise translating, by the processor, a first input received by the touch sensitive interface into a first numerical parameter and a second numerical parameter, wherein the first numerical parameter corresponds to the first location and the second numerical parameter corresponds to the touch pressure.

In various embodiments, the first input, the second input and the third input are translated into a plurality of numerical parameters that can be compared to a control parameter defined by and representative of the unique touch pattern.

The forgoing features and elements may be combined in various combinations without exclusivity, unless expressly indicated herein otherwise. These features and elements as well as the operation of the disclosed embodiments will become more apparent in light of the following description and accompanying drawings.

BRIEF DESCRIPTION OF THE DRAWINGS

The subject matter of the present disclosure is particularly pointed out and distinctly claimed in the concluding portion of the specification. A more complete understanding of the present disclosure, however, may be obtained by referring to the detailed description and claims when considered in connection with the drawing figures, wherein like numerals denote like elements.

DETAILED DESCRIPTION

The detailed description of exemplary embodiments herein makes reference to the accompanying drawings and pictures, which show various embodiments by way of illustration. While these various embodiments are described in sufficient detail to enable those skilled in the art to practice the disclosure, it should be understood that other embodiments may be realized and that logical and mechanical changes may be made without departing from the spirit and scope of the disclosure. Thus, the detailed description herein is presented for purposes of illustration only and not of limitation. For example, the steps recited in any of the method or process descriptions may be executed in any order and are not limited to the order presented. Moreover, any of the functions or steps may be outsourced to or performed by one or more third parties. Furthermore, any reference to singular includes plural embodiments, and any reference to more than one component may include a singular embodiment.

The rise of touch enabled devices and systems are giving way to a need for validation and authentication methods. Traditional validation methods employ pins or patterns that provide little security because they are easily detectable. The systems and methods provided herein provide users with more secure validation and/or authentication schemes for touch enabled devices. Moreover, by leveraging natural rhythms and input frequencies, users are able to validate and/or authenticate access to touch enabled devices.

Figure 1A:
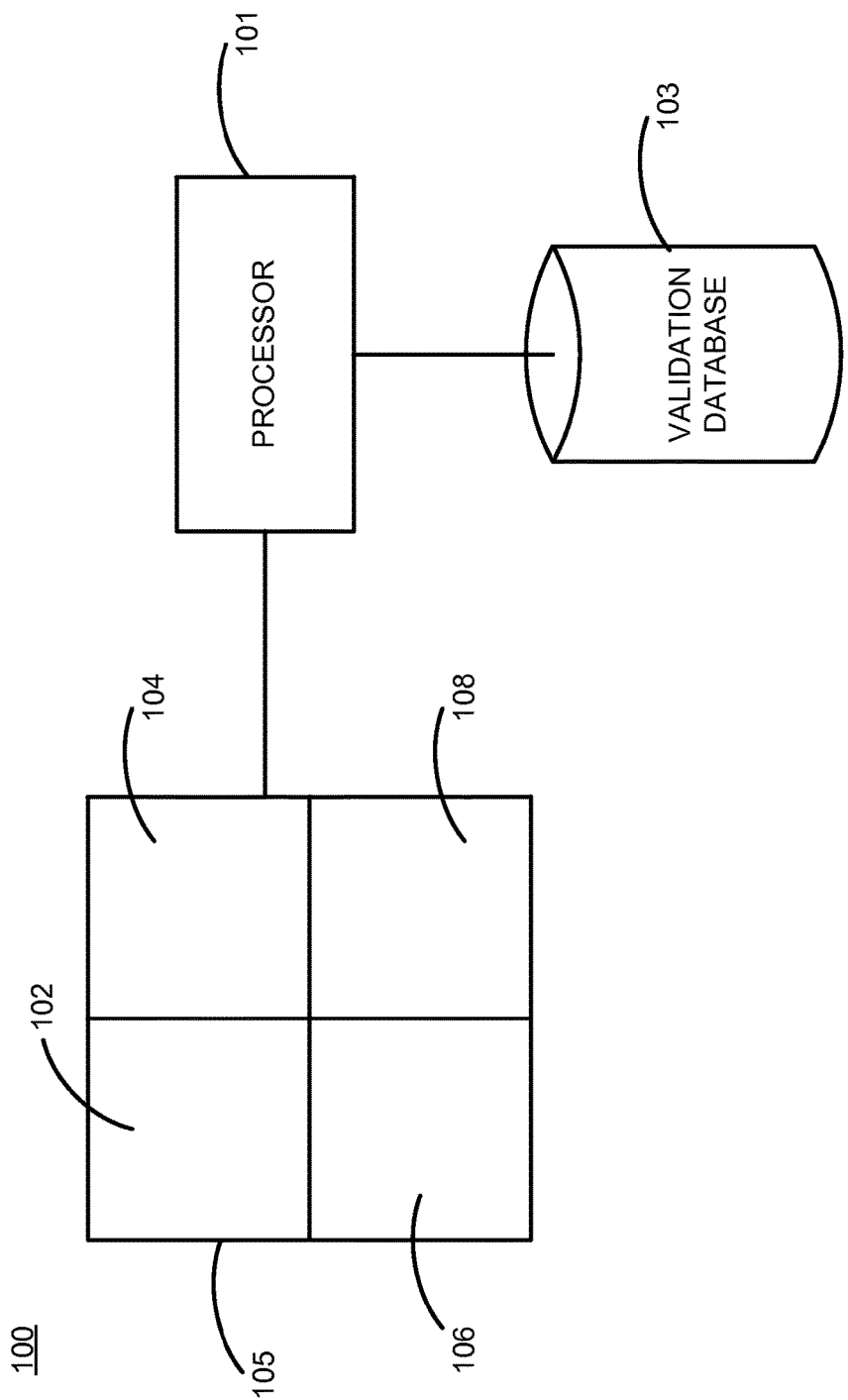
FIG. 1A is a schematic diagram that illustrates a touch enabled system, in accordance with various embodiments.
Figure 1B:
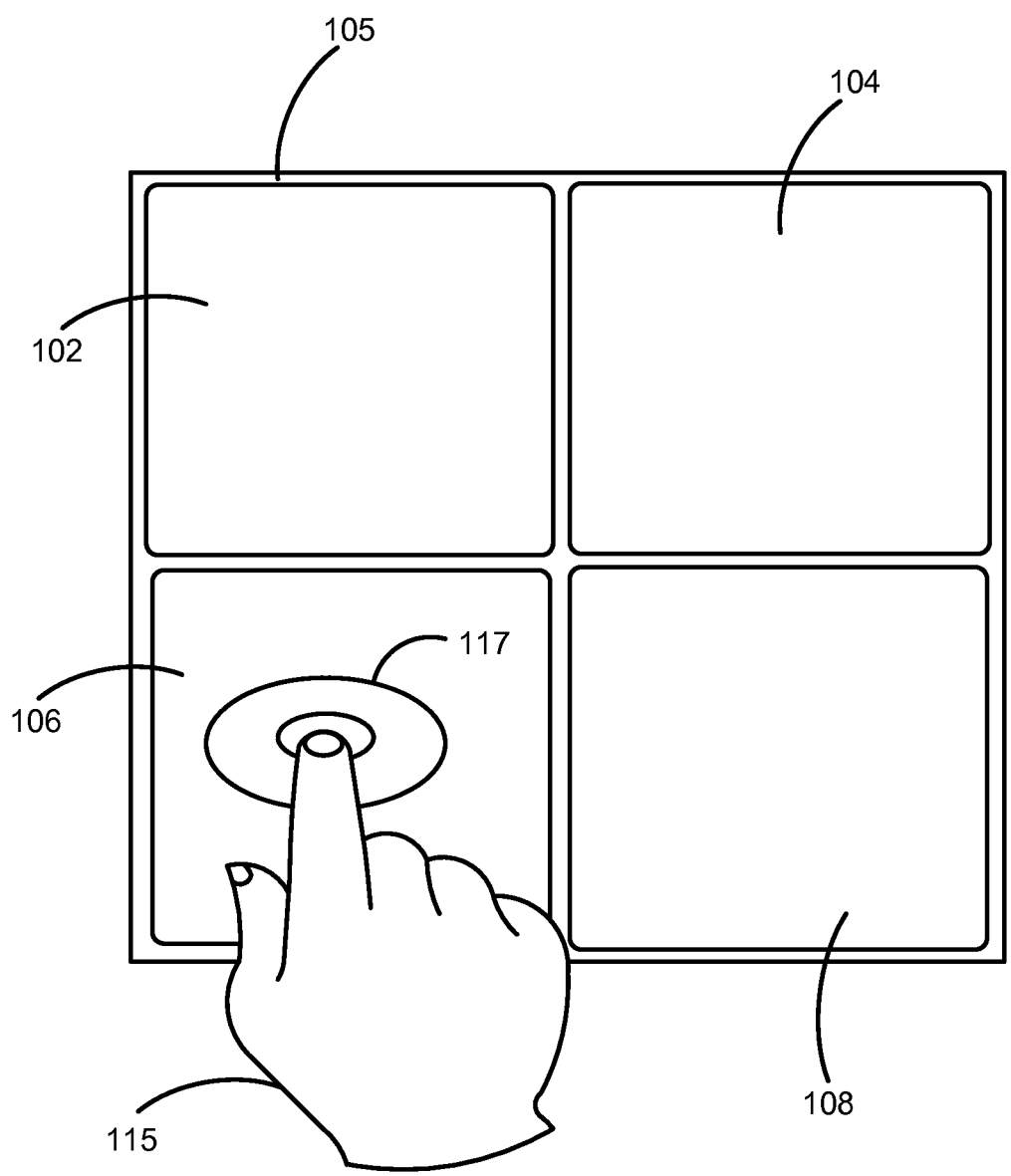
FIG. 1B is a schematic diagram that illustrates an input by a user to an exemplary touch sensitive interface, in accordance with various embodiments.

In various embodiments, and with reference to FIG. 1A and FIG. 1B, system 100 may comprise a touch sensitive interface 105. Touch sensitive interface 105 may be electronically coupled to processor 101 and/or validation database 103. Touch sensitive interface 105 may comprise a plurality of locations. For example, touch sensitive interface 105 may be divided into, may display and/or comprise a grid. The grid may define a plurality of segments, partitions, quadrants, and/or locations on touch sensitive interface 105 including, for example, first location 102, second location 104, third location 106, fourth location 108, and/or the like. Touch sensitive interface 105 may comprise and/or may be divided into any suitable number of locations. Moreover, touch sensitive interface 105 may be divided into a plurality of uniform and/or non-uniform segments.

Touch sensitive interface 105 may be configured to receive one or more inputs 117 from a user 115. In this regard, and in various embodiments, touch sensitive interface 105 may receive an input 117 from a user 115 in one or more various locations defined on touch sensitive interface 105 such as, for example, first location 102, second location 104, third location 106, fourth location 108, and/or the like. Touch sensitive interface 105 may be configured to transmit or provide user inputs and/or touch data to processor 101. In this regard, touch sensitive interface 105 may sense a location of input 117, a touch pressure associated with input 117, and an amount of time that user 115 is in contact with touch sensitive interface 105, then the system may relay that data to processor 101. Moreover, touch sensitive interface 105 may sense the total time for the plurality of inputs provided by user 115 to touch sensitive interface 105. The inputs may be compared with a control input to determine whether a user's input is authentic and access or authorization of an action should be provided by the device.

Figure 2:
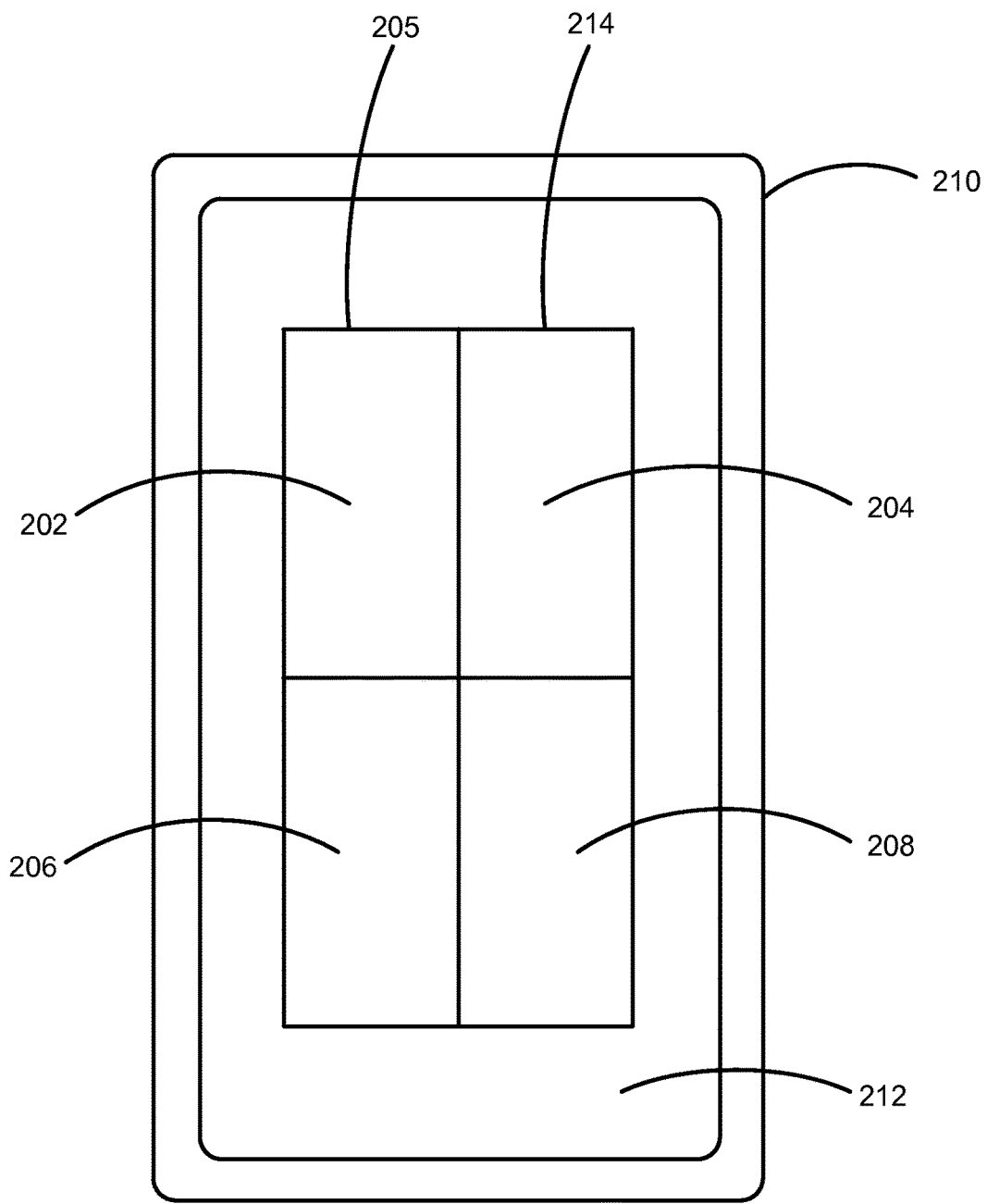
FIG. 2 is a schematic diagram that illustrates an exemplary touch sensitive interface on a mobile device, in accordance with various embodiments.

In various embodiments, and with reference to FIG. 2, touch sensitive interface 205 may be disposed and/or included in any suitable device. For example, touch sensitive interface 205 may be included with a mobile device 210 such as, for example, a touch enabled smart phone, tablet, security panel, access panel, building management system panel and/or the like. Touch sensitive interface 205 may be a portion or an entire screen 212 of mobile device 210. Moreover, touch sensitive interface 205 may comprise and/or may be defined by or segmented by a grid 214. Grid 214 may divide or segment touch sensitive interface 205 into a plurality of locations, segments, and/or quadrants such as, for example, first location 202, second location 204, third location 206, fourth location 208, and/or the like.

In various embodiments, touch sensitive interface 205 may be disposed in any suitable hardware, access point, and/or touch sensitive interface. For example, touch sensitive interface 205 may be disposed in a door access point, a point of sale device, a mobile phone device, and/or the like. Moreover, touch sensitive interface 205 may be used to control access, validate an identity, authorize a transaction, and/or any other suitable validation or authorization.

Figure 3:
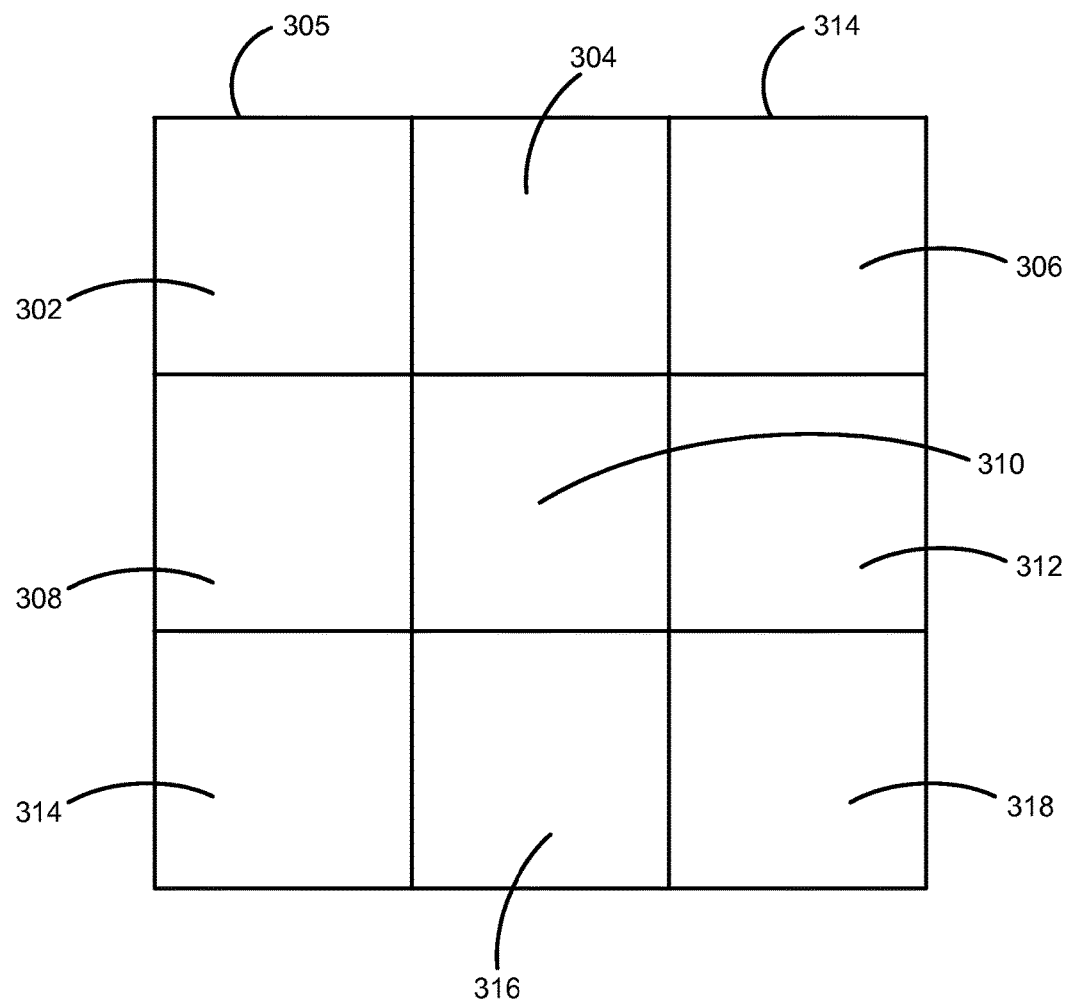
FIG. 3 is a schematic diagram that illustrates an exemplary touch sensitive interface comprising a plurality of segments, in accordance with various embodiments.

In various embodiments, and with reference to FIG. 3, touch sensitive interface 305 may be any suitable size and may be configured in any suitable fashion. For example, touch sensitive interface 305 may be configured to display a grid 314 defining or segmenting touch sensitive interface 305 in any suitable fashion. Grid 314 may divide touch sensitive interface 305 into uniform segments and/or non-uniform segments. Moreover, grid 314 may be displayed allowing a user to detect the location of various segments of touch sensitive interface 305.

In various embodiments, grid 314 may be standardized based on an application. For example, where touch sensitive interface 305 is employed as part of a point of sale terminal, grid 314 may be configured to display a standard plurality of segments arranged in a standardized fashion. This standard arrangement may allow a user to repeatedly enter a unique plurality of inputs that correspond to a unique touch pattern. The unique touch pattern may be associated with access and/or authorization of a particular device and/or transaction instrument such as, for example, a payment enabled smartphone, a transaction account, and/or the like.

Figure 4:
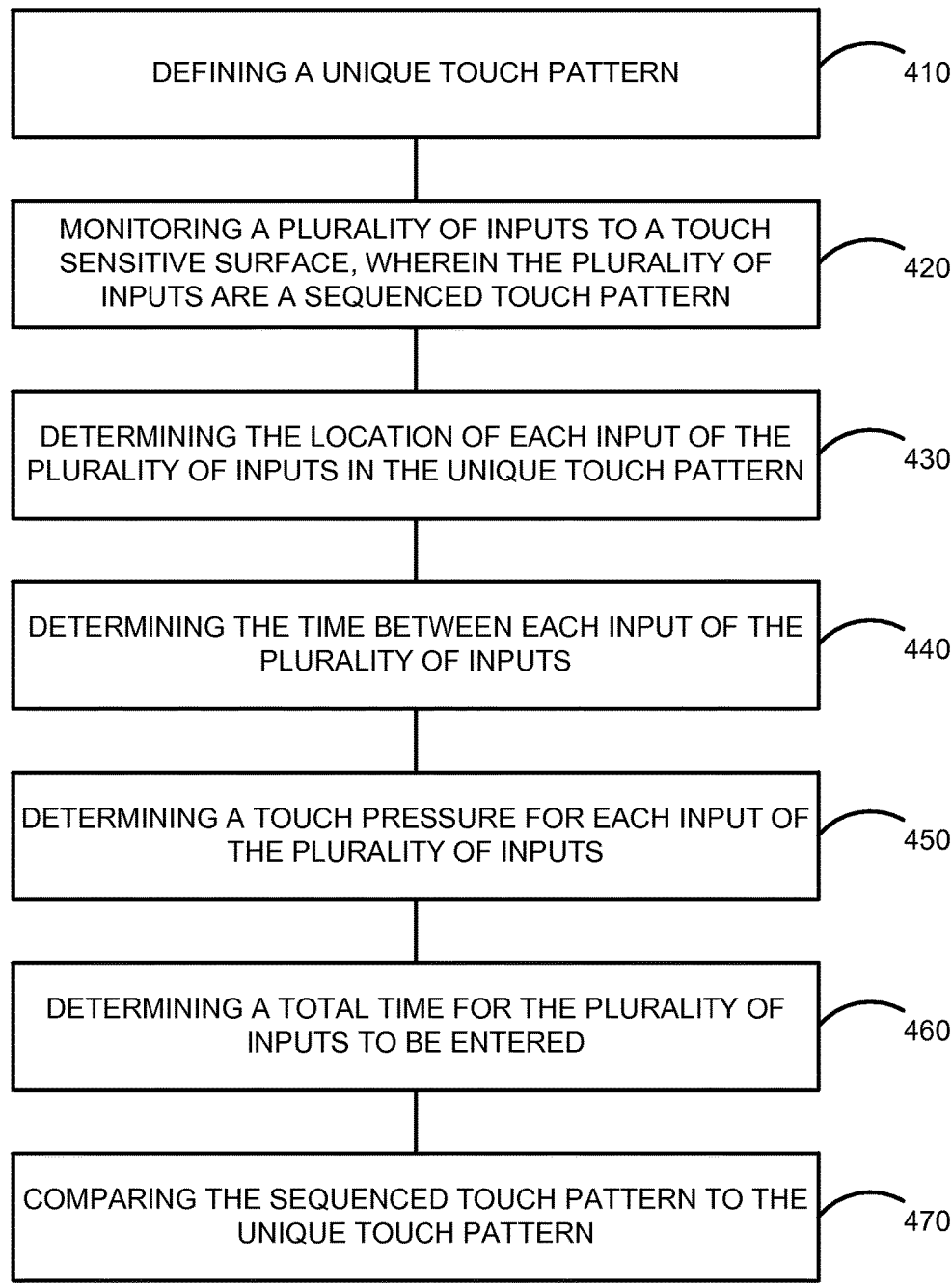
FIG. 4 is a first process flow for gaining access and/or authorizing an activity via a touch sensitive interface, in accordance with various embodiments.

In various embodiments, and with reference to FIGS. 1A-1B and FIG. 4, methods of using a touch sensitive interface to validate and/or authorize an event are provided. Method 400 may comprise defining a unique touch pattern (Step 410). In this regard, a user may enter a plurality of inputs into a touch sensitive interface. The unique touch pattern may include touch pressure for each of the plurality of inputs, the time between each of the plurality of inputs, the total time needed to enter the pattern, and the location of each particular input.

In various embodiments, the unique touch pattern may be similar to a PIN in that it may be entered each time access or authorization is required. Moreover, the unique touch pattern may be associated with the item being access or authorized (e.g., a mobile computing device, a transaction account, and/or the like). Method 400 may further comprise monitoring a plurality of inputs to a touch sensitive surface (step 420). The plurality of inputs may be a sequenced touch pattern. Moreover, the plurality of inputs may be entered by a user in response to a prompt to gain access to and/or authorize an item.

As discussed herein, processor 101 and/or touch sensitive interface 105 may be capable of displaying on, touch sensitive interface 105, a grid defining a plurality of grid locations. The determined first location may correspond to and/or be associated with a grid location from one of the plurality of grid locations. Processor 101 associated with touch sensitive interface 105 may be capable of translating the first input received by touch sensitive interface 105 into a first numerical parameter and a second numerical parameter. The first numerical parameter may correspond to the first location. In this regard, the first numerical parameter may be a numerical representation of a grid location associated with the grid displayed by touch sensitive interface 105. The second numerical parameter may correspond to the touch pressure associated with the first input. Data corresponding to the touch pressure may be evaluated against a plurality of ranges stored in validation database 103 and used by processor 101 to determine a touch pressure associated with the first input.

In various embodiments, method 400 may further comprise determining the location of each input of the plurality of inputs in the unique touch pattern (Step 430). Touch sensitive interface 105 may be configured to receive and/or capture touch data associated with a location on touch sensitive interface 105. Processor 101 may be configured to reduce the location information sensed and/or captured by touch sensitive interface 105 to a numerical parameter.

In various embodiments, touch sensitive interface 105 may include sensors. The sensors of touch sensitive interface 105 may be configured to determine the exact location of a fingertip that contacts touch sensitive interface 105. Moreover, the duration of the contact may be detected by the sensors of touch sensitive interface 105. The sensor may also be configured to measure and/or detect the overall surface area of the fingertip contacting touch sensitive interface 105. In this regard, a greater overall detected surface area of the fingertip may indicate a higher the touch pressure of the fingertip. Moreover, the APIs provided in system 100 may be configured to evaluate the surface area of the fingertip pressed against touch sensitive interface 105 which may be correlated to the force of the touch.

In various embodiments, method 400 may further comprise determining the time between inputs of the plurality of inputs (Step 440). In this regard, touch sensitive interface 105 and/or processor 101 may be configured to determine a time between each touch of the plurality of touches. This information may be used to determine the tempo and/or rhythm of the input. This tempo or rhythm may be compared to a control rhythm based on the tempo or rhythm associated with the unique touch pattern.

In various embodiments, method 400 may further comprise determining the touch pressure for each input of the plurality of inputs (Step 450). Touch sensitive interface 105 may be configured to measure a touch pressure associated with each input 117 of the plurality of inputs. The reading from touch sensitive interface 105 may be provided to processor 101 to be converted to a numerical parameter as discussed herein. For example, the pressure data may be compared to one or more ranges to determine a particular numerical parameter.

In various embodiments, method 400 may further comprise determining a total time for the plurality of inputs to be entered (Step 460). In this regard, touch sensitive interface 105 may be trigger a first instance in response to the first input to processor 101. Touch sensitive interface may trigger a plurality of second instances that occur after the first instance. The total time between the first instance and the plurality of second instances may be determined to determine a total time for the plurality of inputs (e.g., the time between the first instance and the final instance).

In various embodiments, method 400 may further comprise comparing the sequenced pattern to the unique touch pattern (Step 470). In this regard, the various parameters of the input described herein may be converted to numerical parameters. These numerical parameters may be compared to and/or analyzed against a control parameters associated with and/or defined by the unique touch pattern initially identified and/or identified by an administrator.

Figure 5:
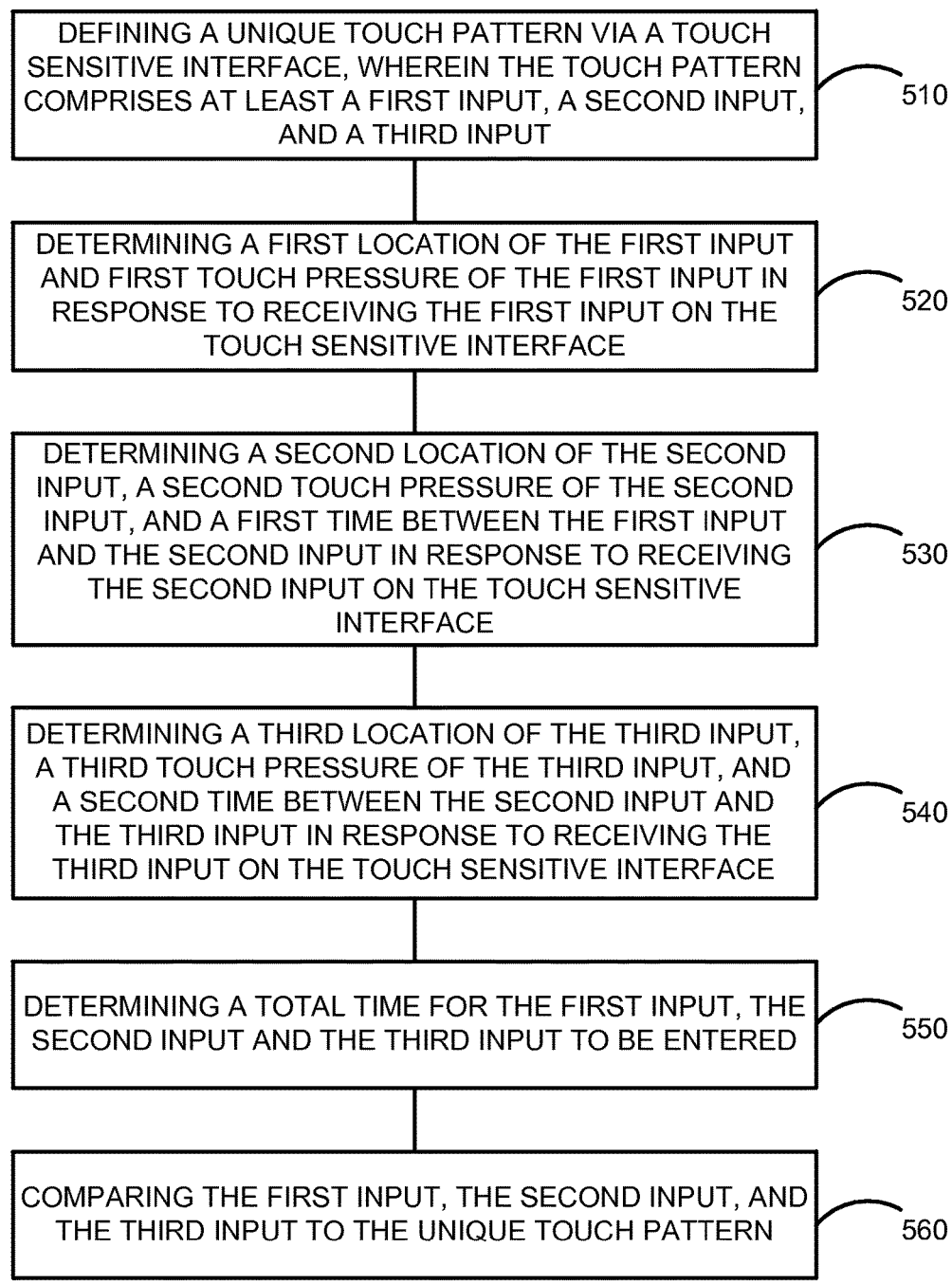
FIG. 5 is a second process flowing for gaining access and/or authorizing an activity via a touch sensitive interface, in accordance with various embodiments.

In various embodiments, and with reference to FIGS. 1A-1B and FIG. 5, method 500 of validating and/or authenticating a touch enabled device is provided. Method 500 may comprise defining a unique touch pattern via touch sensitive interface 105 (Step 510). The unique touch pattern may comprise a first input, a second input, a third input and or the like. In this regard, the unique touch pattern may comprise any suitable number of inputs.

In various embodiments, method 500 may further comprise determining a first location of the first input (e.g., input 117 from user 115) and a first touch pressure of the first input in response to receiving the first input on touch sensitive interface 105 (Step 520). As discussed herein, touch sensitive interface 105 may be broken into segments. The segments may be used to determine the location of an input. The first input may be associated with and/or linked to a segment. The segment information and first input information may be transmitted from touch sensitive interface 105 to processor 101. Processor 101 may be configured to translate and/or convert the segment and/or location information associated with the first input to a numerical parameter that is associated with the first input. Similarly, touch sensitive interface 105 may detect and/or collect information about the touch pressure associated with first input. This information may be transmitted from touch sensitive interface 105 to processor 101. Processor 101 may be configured to analyze the touch pressure to determine a numerical parameter associated with the measured touch pressure for the first input. For example, processor 101 may compare the measured touch pressure to one or more ranges. Processor 101 may determine that a particular measured pressure falls within a particular range. The range may be associated with a particular numerical parameter that may be associated with the first input. In this regard, the characteristics of the first input may be expressed as numerical parameters so that they may be evaluated against a control parameter (e.g., the numerical parameters that represent the unique touch pattern).

In various embodiments, method 500 may further comprise determining a second location of the second input, a second touch pressure of the second input, and a first time between the first input and the second input in response to receiving the second input on the touch sensitive interface 105 (step 530). The second location and second touch pressure of the second input may be determined as described herein with regard to the first location and first touch pressure of the first input. Moreover, touch sensitive interface 105 may be configured to collect time data indicating the time between the first input and the second input. In this regard, touch sensitive interface 105 and with processor 101 may be configured to determine the tempo and/or rhythm of the first input with regard to the second input based on the time between the inputs.

In various embodiments, method 500 may comprise determining a third location of the third input, a third touch pressure of the third input, and a second time between the second input and the third input in response to receiving the third input on touch sensitive interface 105 (step 540). The third location, third touch pressure, and second time associated with the third input may be determined as described herein. Method 500 may further comprise determining a total time for the first input, the second input, and the third input to be entered (step 550). In this regard, touch sensitive interface 105 with processor 101 may capture data indicative of the entire input sequence. This parameter may further define the numerical representation of the inputs provided by the user.

In various embodiments, method 500 may further comprise comparing the first input, the second input, and the third input to the unique touch pattern. In this regard, the unique touch pattern may correspond to and/or may be defined by and represented by a control parameter. The control parameter may be a series of numerical parameters that are representative of the inputs associated with the unique touch pattern when the unique touch pattern was defined in touch sensitive interface 105. Moreover, first input, second input, and third input may be translated into a plurality of numerical parameters that correspond with the first location, first touch pressure, second location, second touch pressure, first time between the first input and second input, third location, third touch pressure, second time between the second input and third input, and the total time for the first input, second input, and third input to be entered. In this way, the first input, second input, and third input may be reduced to a string of numerical parameters that can be compared to the control parameter to determine whether access should be granted to the device for the user.

As used herein, "match" or "associated with" or similar phrases may include an identical match, a partial match, meeting certain criteria, matching a subset of data, a correlation, satisfying certain criteria, a correspondence, an association, an algorithmic relationship and/or the like. Similarly, as used herein, "authenticate" or similar terms may include an exact authentication, a partial authentication, authenticating a subset of data, a correspondence, satisfying certain criteria, an association, an algorithmic relationship and/or the like.

Any communication, transmission and/or channel discussed herein may include any system or method for delivering content (e.g. data, information, metadata, etc.), and/or the content itself. The content may be presented in any form or medium, and in various embodiments, the content may be delivered electronically and/or capable of being presented electronically. For example, a channel may comprise a website or device (e.g., Facebook, YOUTUBE®, APPLE®TV®, PANDORA®, XBOX®, SONY® PLAYSTATION®), a uniform resource locator ("URL"), a document (e.g., a MICROSOFT® Word® document, a MICROSOFT® Excel® document, an ADOBE® .pdf document, etc.), an "ebook," an "emagazine," an application or microapplication (as described herein), an SMS or other type of text message, an email, facebook, twitter, MMS and/or other type of communication technology. In various embodiments, a channel may be hosted or provided by a data partner. In various embodiments, the distribution channel may comprise at least one of a merchant website, a social media website, affiliate or partner websites, an external vendor, a mobile device communication, social media network and/or location based service. Distribution channels may include at least one of a merchant website, a social media site, affiliate or partner websites, an external vendor, and a mobile device communication. Examples of social media sites include FACEBOOK®, FOURSQUARE®, TWITTER®, MYSPACE®, LINKEDIN®, and the like. Examples of affiliate or partner websites include AMERICAN EXPRESS®, GROUPON®, LIVINGSOCIAL®, and the like. Moreover, examples of mobile device communications include texting, email, and mobile applications for smartphones.

A "consumer profile" or "consumer profile data" may comprise any information or data about a consumer that describes an attribute associated with the consumer (e.g., a preference, an interest, demographic information, personally identifying information, and the like).

In various embodiments, the methods described herein are implemented using the various particular machines described herein. The methods described herein may be implemented using the below particular machines, and those hereinafter developed, in any suitable combination, as would be appreciated immediately by one skilled in the art. Further, as is unambiguous from this disclosure, the methods described herein may result in various transformations of certain articles.

For the sake of brevity, conventional data networking, application development and other functional aspects of the systems (and components of the individual operating components of the systems) may not be described in detail herein. Furthermore, the connecting lines shown in the various figures contained herein are intended to represent exemplary functional relationships and/or physical couplings between the various elements. It should be noted that many alternative or additional functional relationships or physical connections may be present in a practical system.

The various system components discussed herein may include one or more of the following: a host server or other computing systems including a processor for processing digital data; a memory coupled to the processor for storing digital data; an input digitizer coupled to the processor for inputting digital data; an application program stored in the memory and accessible by the processor for directing processing of digital data by the processor; a display device coupled to the processor and memory for displaying information derived from digital data processed by the processor; and a plurality of databases. Various databases used herein may include: client data; merchant data; financial institution data; and/or like data useful in the operation of the system. As those skilled in the art will appreciate, user computer may include an operating system (e.g., WINDOWS® NT®, WINDOWS® 95/98/2000®, WINDOWS® XP®, WINDOWS® Vista®, WINDOWS® 7®, OS2, UNIX®, LINUX®, SOLARISED, MacOS, etc.) as well as various conventional support software and drivers typically associated with computers.

The present system or any part(s) or function(s) thereof may be implemented using hardware, software or a combination thereof and may be implemented in one or more computer systems or other processing systems. However, the manipulations performed by embodiments were often referred to in terms, such as matching or selecting, which are commonly associated with mental operations performed by a human operator. No such capability of a human operator is necessary, or desirable in most cases, in any of the operations described herein. Rather, the operations may be machine operations. Useful machines for performing the various embodiments include general purpose digital computers or similar devices.

In fact, in various embodiments, the embodiments are directed toward one or more computer systems capable of carrying out the functionality described herein. The computer system includes one or more processors, such as processor. The processor is connected to a communication infrastructure (e.g., a communications bus, cross over bar, or network). Various software embodiments are described in terms of this exemplary computer system. After reading this description, it will become apparent to a person skilled in the relevant art(s) how to implement various embodiments using other computer systems and/or architectures. Computer system can include a display interface that forwards graphics, text, and other data from the communication infrastructure (or from a frame buffer not shown) for display on a display unit.

Computer system also includes a main memory, such as for example random access memory (RAM), and may also include a secondary memory. The secondary memory may include, for example, a hard disk drive and/or a removable storage drive, representing a floppy disk drive, a magnetic tape drive, an optical disk drive, etc. The removable storage drive reads from and/or writes to a removable storage unit in a well-known manner. Removable storage unit represents a floppy disk, magnetic tape, optical disk, etc. which is read by and written to by removable storage drive. As will be appreciated, the removable storage unit includes a computer usable storage medium having stored therein computer software and/or data.

In various embodiments, secondary memory may include other similar devices for allowing computer programs or other instructions to be loaded into computer system. Such devices may include, for example, a removable storage unit and an interface. Examples of such may include a program cartridge and cartridge interface (such as that found in video game devices), a removable memory chip (such as an erasable programmable read only memory (EPROM), or programmable read only memory (PROM)) and associated socket, and other removable storage units and interfaces, which allow software and data to be transferred from the removable storage unit to computer system.

Computer system may also include a communications interface. Communications interface allows software and data to be transferred between computer system and external devices. Examples of communications interface may include a modem, a network interface (such as an Ethernet card), a communications port, a Personal Computer Memory Card International Association (PCMCIA) slot and card, etc. Software and data transferred via communications interface are in the form of signals which may be electronic, electromagnetic, optical or other signals capable of being received by communications interface. These signals are provided to communications interface via a communications path (e.g., channel). This channel carries signals and may be implemented using wire, cable, fiber optics, a telephone line, a cellular link, a radio frequency (RF) link, wireless and other communications channels.

The terms "computer program medium" and "computer usable medium" and "computer readable medium" are used to generally refer to media such as removable storage drive and a hard disk installed in hard disk drive. These computer program products provide software to computer system.

Computer programs (also referred to as computer control logic) are stored in main memory and/or secondary memory. Computer programs may also be received via communications interface. Such computer programs, when executed, enable the computer system to perform the features as discussed herein. In particular, the computer programs, when executed, enable the processor to perform the features of various embodiments. Accordingly, such computer programs represent controllers of the computer system.

In various embodiments, software may be stored in a computer program product and loaded into computer system using removable storage drive, hard disk drive or communications interface. The control logic (software), when executed by the processor, causes the processor to perform the functions of various embodiments as described herein. In various embodiments, hardware components such as application specific integrated circuits (ASICs). Implementation of the hardware state machine so as to perform the functions described herein will be apparent to persons skilled in the relevant art(s).

In various embodiments, components, modules, and/or engines of system 100 may be implemented as microapplications or micro-apps. Micro-apps are typically deployed in the context of a mobile operating system, including for example, a PALM® mobile operating system, a WINDOWS® mobile operating system, an ANDROID® Operating System, APPLE® IOS®, a BLACKBERRY® operating system and the like. The micro-app may be configured to leverage the resources of the larger operating system and associated hardware via a set of predetermined rules which govern the operations of various operating systems and hardware resources. For example, where a micro-app desires to communicate with a device or network other than the mobile device or mobile operating system, the micro-app may leverage the communication protocol of the operating system and associated device hardware under the predetermined rules of the mobile operating system. Moreover, where the micro-app desires an input from a user, the micro-app may be configured to request a response from the operating system which monitors various hardware components and then communicates a detected input from the hardware to the micro-app.

As used herein an "identifier" may be any suitable identifier that uniquely identifies an item. For example, the identifier may be a globally unique identifier ("GUID"). The GUID may be an identifier created and/or implemented under the universally unique identifier standard. Moreover, the GUID may be stored as 128-bit value that can be displayed as 32 hexadecimal digits. The identifier may also include a major number, and a minor number. The major number and minor number may each be 16 bit integers.

As used herein, the term "network" includes any cloud, cloud computing system or electronic communications system or method which incorporates hardware and/or software components. Communication among the parties may be accomplished through any suitable communication channels, such as, for example, a telephone network, an extranet, an intranet, Internet, point of interaction device (point of sale device, personal digital assistant (e.g., IPHONE®, PALM® PILOT®, BLACKBERRY®), cellular phone, kiosk, etc.), online communications, satellite communications, off-line communications, wireless communications, transponder communications, local area network (LAN), wide area network (WAN), virtual private network (VPN), networked or linked devices, keyboard, mouse and/or any suitable communication or data input modality. Moreover, although the system is frequently described herein as being implemented with TCP/IP communications protocols, the system may also be implemented using IPX, APPLE®talk, IP-6, NetBIOS®, OSI, any tunneling protocol (e.g. IPsec, SSH), or any number of existing or future protocols. If the network is in the nature of a public network, such as the Internet, it may be advantageous to presume the network to be insecure and open to eavesdroppers. Specific information related to the protocols, standards, and application software utilized in connection with the Internet is generally known to those skilled in the art and, as such, need not be detailed herein.

"Cloud" or "Cloud computing" includes a model for enabling convenient, on-demand network access to a shared pool of configurable computing resources (e.g., networks, servers, storage, applications, and services) that can be rapidly provisioned and released with minimal management effort or service provider interaction. Cloud computing may include location-independent computing, whereby shared servers provide resources, software, and data to computers and other devices on demand.

As used herein, "transmit" may include sending electronic data from one system component to another over a network connection. Additionally, as used herein, "data" may include encompassing information such as commands, queries, files, data for storage, and the like in digital or any other form.

More particularly, a "key field" partitions the database according to the high-level class of objects defined by the key field. For example, certain types of data may be designated as a key field in a plurality of related data tables and the data tables may then be linked on the basis of the type of data in the key field. The data corresponding to the key field in each of the linked data tables is preferably the same or of the same type. However, data tables having similar, though not identical, data in the key fields may also be linked by using AGREP, for example. In accordance with one embodiment, any suitable data storage technique may be utilized to store data without a standard format. Data sets may be stored using any suitable technique, including, for example, storing individual files using an ISO/IEC 7816-4 file structure; implementing a domain whereby a dedicated file is selected that exposes one or more elementary files containing one or more data sets; using data sets stored in individual files using a hierarchical filing system; data sets stored as records in a single file (including compression, SQL accessible, hashed via one or more keys, numeric, alphabetical by first tuple, etc.); Binary Large Object (BLOB); stored as ungrouped data elements encoded using ISO/IEC 7816-6 data elements; stored as ungrouped data elements encoded using ISO/IEC Abstract Syntax Notation (ASN.1) as in ISO/IEC 8824 and 8825; and/or other proprietary techniques that may include fractal compression methods, image compression methods, etc.

The data set annotation may also be used for other types of status information as well as various other purposes. For example, the data set annotation may include security information establishing access levels. The access levels may, for example, be configured to permit only certain individuals, levels of employees, companies, or other entities to access data sets, or to permit access to specific data sets based on the transaction, merchant, issuer, user or the like. Furthermore, the security information may restrict/permit only certain actions such as accessing, modifying, and/or deleting data sets. In one example, the data set annotation indicates that only the data set owner or the user are permitted to delete a data set, various identified users may be permitted to access the data set for reading, and others are altogether excluded from accessing the data set. However, other access restriction parameters may also be used allowing various entities to access a data set with various permission levels as appropriate.

The data, including the header or trailer may be received by a stand-alone interaction device configured to add, delete, modify, or augment the data in accordance with the header or trailer. As such, in one embodiment, the header or trailer is not stored on the transaction device along with the associated issuer-owned data but instead the appropriate action may be taken by providing to the transaction instrument user at the stand alone device, the appropriate option for the action to be taken. The system may contemplate a data storage arrangement wherein the header or trailer, or header or trailer history, of the data is stored on the transaction instrument in relation to the appropriate data.

One skilled in the art will also appreciate that, for security reasons, any databases, systems, devices, servers or other components of the system may consist of any combination thereof at a single location or at multiple locations, wherein each database or system includes any of various suitable security features, such as firewalls, access codes, encryption, decryption, compression, decompression, and/or the like.

Encryption may be performed by way of any of the techniques now available in the art or which may become available—e.g., Twofish, RSA, El Gamal, Schorr signature, DSA, PGP, PKI, GPG (GnuPG), and symmetric and asymmetric cryptosystems.

The computing unit of the web client may be further equipped with an Internet browser connected to the Internet or an intranet using standard dial-up, cable, DSL or any other Internet protocol known in the art. Transactions originating at a web client may pass through a firewall in order to prevent unauthorized access from users of other networks. Further, additional firewalls may be deployed between the varying components of CMS to further enhance security.

The computers discussed herein may provide a suitable website or other Internet-based graphical user interface which is accessible by users. In one embodiment, the MICROSOFT® INTERNET INFORMATION SERVICES® (IIS), MICROSOFT® Transaction Server (MTS), and MICROSOFT® SQL Server, are used in conjunction with the MICROSOFT® operating system, MICROSOFT® NT web server software, a MICROSOFT® SQL Server database system, and a MICROSOFT® Commerce Server. Additionally, components such as Access or MICROSOFT® SQL Server, ORACLE®, Sybase, Informix MySQL, Interbase, etc., may be used to provide an Active Data Object (ADO) compliant database management system. In one embodiment, the Apache web server is used in conjunction with a Linux operating system, a MySQL database, and the Perl, PHP, and/or Python programming languages.

The system and method may be described herein in terms of functional block components, screen shots, optional selections and various processing steps. It should be appreciated that such functional blocks may be realized by any number of hardware and/or software components configured to perform the specified functions. For example, the system may employ various integrated circuit components, e.g., memory elements, processing elements, logic elements, look-up tables, and the like, which may carry out a variety of functions under the control of one or more microprocessors or other control devices. Similarly, the software elements of the system may be implemented with any programming or scripting language such as C, C++, C#, JAVA, JAVASCRIPT, VBScript, Macromedia Cold Fusion, COBOL, MICROSOFT® Active Server Pages, assembly, PERL, PHP, awk, Python, Visual Basic, SQL Stored Procedures, PL/SQL, any UNIX shell script, and extensible markup language (XML) with the various algorithms being implemented with any combination of data structures, objects, processes, routines or other programming elements. Further, it should be noted that the system may employ any number of conventional techniques for data transmission, signaling, data processing, network control, and the like. Still further, the system could be used to detect or prevent security issues with a client-side scripting language, such as JAVASCRIPT, VBScript or the like.

The system and method is described herein with reference to screen shots, block diagrams and flowchart illustrations of methods, apparatus (e.g., systems), and computer program products according to various embodiments. It will be understood that each functional block of the block diagrams and the flowchart illustrations, and combinations of functional blocks in the block diagrams and flowchart illustrations, respectively, can be implemented by computer program instructions.

These computer program instructions may be loaded onto a general purpose computer, special purpose computer, or other programmable data processing apparatus to produce a machine, such that the instructions that execute on the computer or other programmable data processing apparatus create means for implementing the functions specified in the flowchart block or blocks. These computer program instructions may also be stored in a computer-readable memory that can direct a computer or other programmable data processing apparatus to function in a particular manner, such that the instructions stored in the computer-readable memory produce an article of manufacture including instruction means which implement the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions which execute on the computer or other programmable apparatus provide steps for implementing the functions specified in the flowchart block or blocks.

Accordingly, functional blocks of the block diagrams and flowchart illustrations support combinations of means for performing the specified functions, combinations of steps for performing the specified functions, and program instruction means for performing the specified functions. It will also be understood that each functional block of the block diagrams and flowchart illustrations, and combinations of functional blocks in the block diagrams and flowchart illustrations, can be implemented by either special purpose hardware-based computer systems which perform the specified functions or steps, or suitable combinations of special purpose hardware and computer instructions. Further, illustrations of the process flows and the descriptions thereof may make reference to user WINDOWS®, webpages, websites, web forms, prompts, etc. Practitioners will appreciate that the illustrated steps described herein may comprise in any number of configurations including the use of WINDOWS®, webpages, web forms, popup WINDOWS®, prompts and the like. It should be further appreciated that the multiple steps as illustrated and described may be combined into single webpages and/or WINDOWS® but have been expanded for the sake of simplicity. In other cases, steps illustrated and described as single process steps may be separated into multiple webpages and/or WINDOWS® but have been combined for simplicity.

The term "non-transitory" is to be understood to remove only propagating transitory signals per se from the claim scope and does not relinquish rights to all standard computer-readable media that are not only propagating transitory signals per se. Stated another way, the meaning of the term "non-transitory computer-readable medium" and "non-transitory computer-readable storage medium" should be construed to exclude only those types of transitory computer-readable media which were found in In Re Nuijten to fall outside the scope of patentable subject matter under 35 U.S.C. § 101.

Benefits, other advantages, and solutions to problems have been described herein with regard to specific embodiments. However, the benefits, advantages, solutions to problems, and any elements that may cause any benefit, advantage, or solution to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to 'at least one of A, B, and C' or 'at least one of A, B, or C' is used in the claims or specification, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Although the disclosure includes a method, it is contemplated that it may be embodied as computer program instructions on a tangible computer-readable carrier, such as a magnetic or optical memory or a magnetic or optical disk. All structural, chemical, and functional equivalents to the elements of the above-described various embodiments that are known to those of ordinary skill in the art are expressly incorporated herein by reference and are intended to be encompassed by the present claims. Moreover, it is not necessary for a device or method to address each and every problem sought to be solved by the present disclosure, for it to be encompassed by the present claims. Furthermore, no element, component, or method step in the present disclosure is intended to be dedicated to the public regardless of whether the element, component, or method step is explicitly recited in the claims. No claim element herein is to be construed under the provisions of 35 U.S.C. 112(f) unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A method, comprising:
    determining, by a processor in electronic communication with a device having a touch sensitive interface, a first location of a first input, a first touch pressure of the first input and a first amount of an entire time the first input is in contact with the touch sensitive interface, in response to receiving the first input on the touch sensitive interface;
    determining, by the processor, a second location of a second input, a second touch pressure of the second input, and a second amount of the entire time the second input is in contact with the touch sensitive interface, in response to receiving the second input on the touch sensitive interface;
    determining, by the processor, a third location of a third input, a third touch pressure of the third input, and a third amount of the entire time the third input is in contact with the touch sensitive interface, in response to receiving the third input on the touch sensitive interface;
    comparing, by the processor, the first location, the second location, the third location, the first touch pressure, the second touch pressure, the third touch pressure, along with the combination of the first amount of the entire time, the second amount of the entire time and the third amount of the entire time to a unique touch pattern; and
    granting, by the processor, access to the device, in response to the comparing being a success.

2. The method of claim 1, further comprising defining, via the processor, the unique touch pattern via the touch sensitive interface, wherein the touch pattern comprises at least a first input, a second input, and a third input.

3. The method of claim 2, further comprising determining, by the processor, a control parameter that is defined by and indicative of the unique touch pattern, in response to receiving the unique touch pattern via the touch sensitive interface.

4. The method of claim 1, further comprising:
    determining, by the processor, a first duration between the first input and the second input;
    determining, by the processor, a second duration between the second input and the third input;
    determining, by the processor, a total time for the first input, the second input and the third input to be entered based on the first duration and the second duration; and
    further comparing based on the total time.

5. The method of claim 1, wherein the touch sensitive interface is part of at least one of a door, a point of sale device, or a computing device.

6. The method of claim 1, further comprising displaying, by the processor, a grid defining a plurality of grid locations on the touch sensitive interface.

7. The method of claim 6, wherein the first location corresponds to a grid location of the plurality of grid locations.

8. The method of claim 1, further comprising translating, by the processor, the first input received by the touch sensitive interface into a first numerical parameter and a second numerical parameter, wherein the first numerical parameter corresponds to the first location and the second numerical parameter corresponds to the touch pressure.

9. The method of claim 1, wherein the first input, the second input and the third input are translated into a plurality of numerical parameters that are compared to a control parameter defined by and representative of the unique touch pattern.

10. A system comprising:
- a touch sensitive interface;
- a processor in electronic communication with the touch sensitive interface,
- a tangible, non-transitory memory configured to communicate with the processor, the tangible, non-transitory memory having instructions stored thereon that, in response to execution by the processor, cause the processor to perform operations comprising:
- determining, by the processor, a first location of a first input, a first touch pressure of the first input and a first amount of an entire time the first input is in contact with the touch sensitive interface, in response to receiving the first input on the touch sensitive interface;
- determining, by the processor, a second location of a second input, a second touch pressure of the second input, and a second amount of the entire time the second input is in contact with the touch sensitive interface, in response to receiving the second input on the touch sensitive interface;
- determining, by the processor, a third location of a third input, a third touch pressure of the third input, and a third amount of the entire time the third input is in contact with the touch sensitive interface, in response to receiving the third input on the touch sensitive interface;
- comparing, by the processor, the first location, the second location, the third location, the first touch pressure, the second touch pressure, the third touch pressure, along with the combination of the first amount of the entire time, the second amount of the entire time and the third amount of the entire time to a unique touch pattern; and
- granting, by the processor, access to the system, in response to the comparing being a success.

11. The method of claim 1, wherein the first touch pressure is based on detecting a greater surface area of a fingertip.

12. The method of claim 1, wherein the first touch pressure is greater based on detecting a greater surface area of a fingertip.

13. The method of claim 1, wherein a surface area of a fingertip pressed against the touch sensitive interface correlates to a first touch pressure.

14. The method of claim 1, wherein the first touch pressure is assigned a value if the first touch pressure falls within a predetermined range.

15. An article of manufacture including a non-transitory, tangible computer readable storage medium having instructions stored thereon that, in response to execution by a computer-based system comprising a touch sensitive interface in electronic communication with a processor, cause the processor to perform operations comprising:
- determining, by the processor, a first location of a first input, a first touch pressure of the first input and a first amount of an entire time the first input is in contact with the touch sensitive interface, in response to receiving the first input on the touch sensitive interface;
- determining, by the processor, a second location of a second input, a second touch pressure of the second input, and a second amount of the entire time the second input is in contact with the touch sensitive interface, in response to receiving the second input on the touch sensitive interface;
- determining, by the processor, a third location of a third input, a third touch pressure of the third input, and a third amount of the entire time the third input is in contact with the touch sensitive interface, in response to receiving the third input on the touch sensitive interface;
- comparing, by the processor, the first location, the second location, the third location, the first touch pressure, the second touch pressure, the third touch pressure, along with the combination of the first amount of the entire time, the second amount of the entire time and the third amount of the entire time to a unique touch pattern; and
- granting, by the processor, access to the computer-based system, in response to the comparing being a success.

16. The method of claim 1, further comprising determining, by the processor, a total time for the first input, the second input and the third input to be in contact with the screen based on the first amount of time, the second amount of time and the third amount of time.

17. The article of claim 15, further comprising determining, by the processor, a control parameter that is defined by and indicative of the unique touch pattern.

18. The article of claim 15, further comprising translating, by the processor, the first input received by the touch sensitive interface into a first numerical parameter and a second numerical parameter, wherein the first numerical parameter corresponds to the first location and the second numerical parameter corresponds to the touch pressure.

19. The article of claim 15, wherein the first input, the second input and the third input are translated into a plurality of numerical parameters that are compared to a control parameter defined by and representative of the unique touch pattern.

* * * * *